HARRIS & SLEWDER.
Cultivator.
No. 27,125. Patented Feb. 14, 1860.
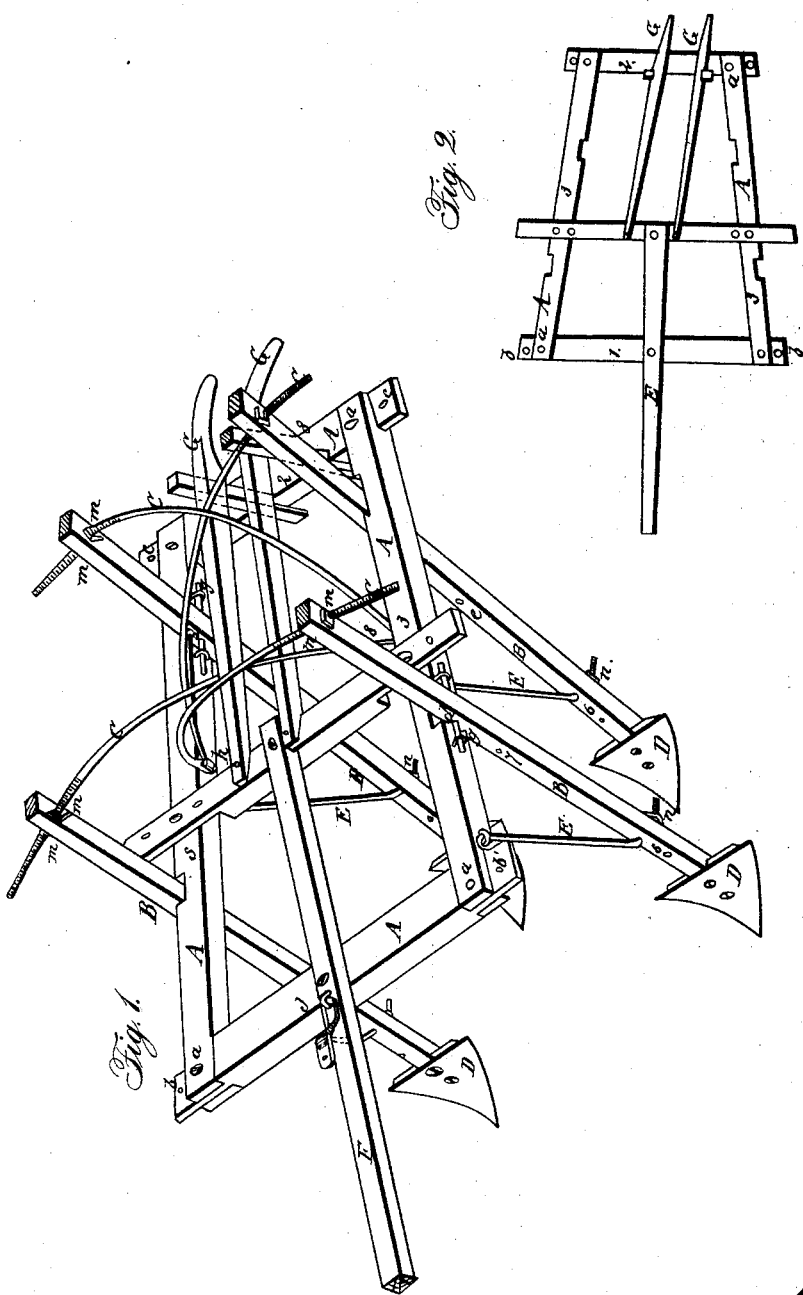

UNITED STATES PATENT OFFICE.

J. O. HARRIS AND W. F. SLEWDER, OF OTTAWA, ILLINOIS.

IMPROVEMENT IN CULTIVATORS.

Specification forming part of Letters Patent No. 27,125, dated February 14, 1860.

*To all whom it may concern:*

Be it known that we, J. O. HARRIS and W. F. SLEWDER, of Ottawa, in the county of La Salle and State of Illinois, have invented certain new and useful Improvements in Corn-Plows; and we do hereby declare that the following is a full, clear, and exact description of the construction and operation of the same, reference being had to the accompanying drawings, in which—

Figure 1 represents a perspective view of said corn-plow. Fig. 2 represents a top view of the plow-frame on a reduced scale.

The nature of our invention relates to the manner constructing and combining the plow-stocks and the frame of the implement, so that the positions of the plows can be adjusted or reversed to make it adaptable for the cultivation of corn in the different stages of its growth.

To enable others skilled in the art to make and use our invention, we will proceed to describe its construction and operation.

A represents the frame of the machine. The front end, 1, is wider than the rear end, 2, and the side pieces, 3, and converging toward the rear. The pieces 1 and 2 are mortised to the side pieces, and are secured to them by means of screws or bolts $a$.

$b$ and $c$ represent adjusting-holes in the mortises of the front and end pieces, by means of which the width of the frame can be adjusted.

B represents the plow-stocks. They are hinged to the sides of the frame A by means of the pivots $d$, which are hung in the staples $g$. The stocks B are secured in their proper positions by means of the bent rods C, which are bolted to the sides of the frame A at $h$. The ends of said rods C, which have screw-threads cut on their circumference, pass through the upper part of the stock B, and are secured to them by means of the screw-nuts $m$, which hold the stocks B to the frame at their upper part. This arrangement affords the means of spreading or contracting the plows D to any desired position.

The plow-stocks, and consequently the plows, are braced to the frame A by means of the braces E, which are hung to the frame A at $k$ by dead-eyes or otherwise, and which are secured to the stocks B by means of the screw-nuts $n$, and thus hold and brace said stocks near their lower ends. The stocks B are also adjustable in the direction of their length, and are for that purpose provided with adjusting-holes 6, 7, and 8, into which the braces E, pivots $d$, and rods C can be respectively inserted for the purpose of raising and lowering the stocks B.

F represents the tongue, to which the team is attached, and which is so attached as to be easily taken off and reversed on the frame; and G represents the handles by which the plow is guided. These handles are secured to the frame A in oblique positions, as represented in Fig. 2, for a purpose hereinafter to be explained.

By unscrewing the nuts and screws by which the parts of this machine are secured together the entire machine can be reversed, so that the narrow end 2 will be the front of the machine. This is done by reversing the side pieces, 3, and by securing them to the end pieces in a similar manner, as above described. When the machine is thus reversed the front plows will be nearer together than the rear plows. While in the above-described position the rear plows are nearer together than the front plows, as represented in the drawings. Thus it will be seen that the positions of the plows D are adjustable in three different directions: First, they can be spread or contracted; secondly, they can be raised or lowered; and, thirdly, they can be reversed.

In working this plow it is run astride of the the rows of corn, the operator walking between the rows and plowing an entire row at a time. This can be done by having the handles G attached obliquely to the frame, as above described. When the corn is small the wide end 1 is run foremost, so as not to throw too much earth on the corn. After the corn is well grown the machine is reversed, so as to hill the corn and leave the ground between the rows in good shape. In either case the position of the plows can be so adjusted that they will throw a greater or less quantity of earth on the corn-plants, as will be most suitable for them at the different stages of their growth, and thus this plow can be used for the cultivation of the corn from the time it is out of the ground until the cultivation can be dispensed with, and no further hoeing or application of other plows is required.

One pair of plows should be larger than the other, which enables the user to more readily graduate the quantity of earth to be thrown toward the plants.

The tongue is deemed a part of the frame in so far as its reversible character is involved.

Having thus fully described the nature of our invention, what we claim therein as new, and desire to secure by Letters Patent, is—

In combination with a V-shaped adjustable and reversible frame, the adjustable and hinged plow-stocks B, when constructed and arranged substantially in the manner and for the purpose herein described.

J. O. HARRIS.
W. F. SLEWDER.

Witnesses:
E. Y. GRIGGS,
R. N. WATERMAN.